Aug. 9, 1932.  W. J. HORTON  1,870,850
ATTACHMENT TO CULTIVATING MACHINES
Filed Oct. 12, 1928
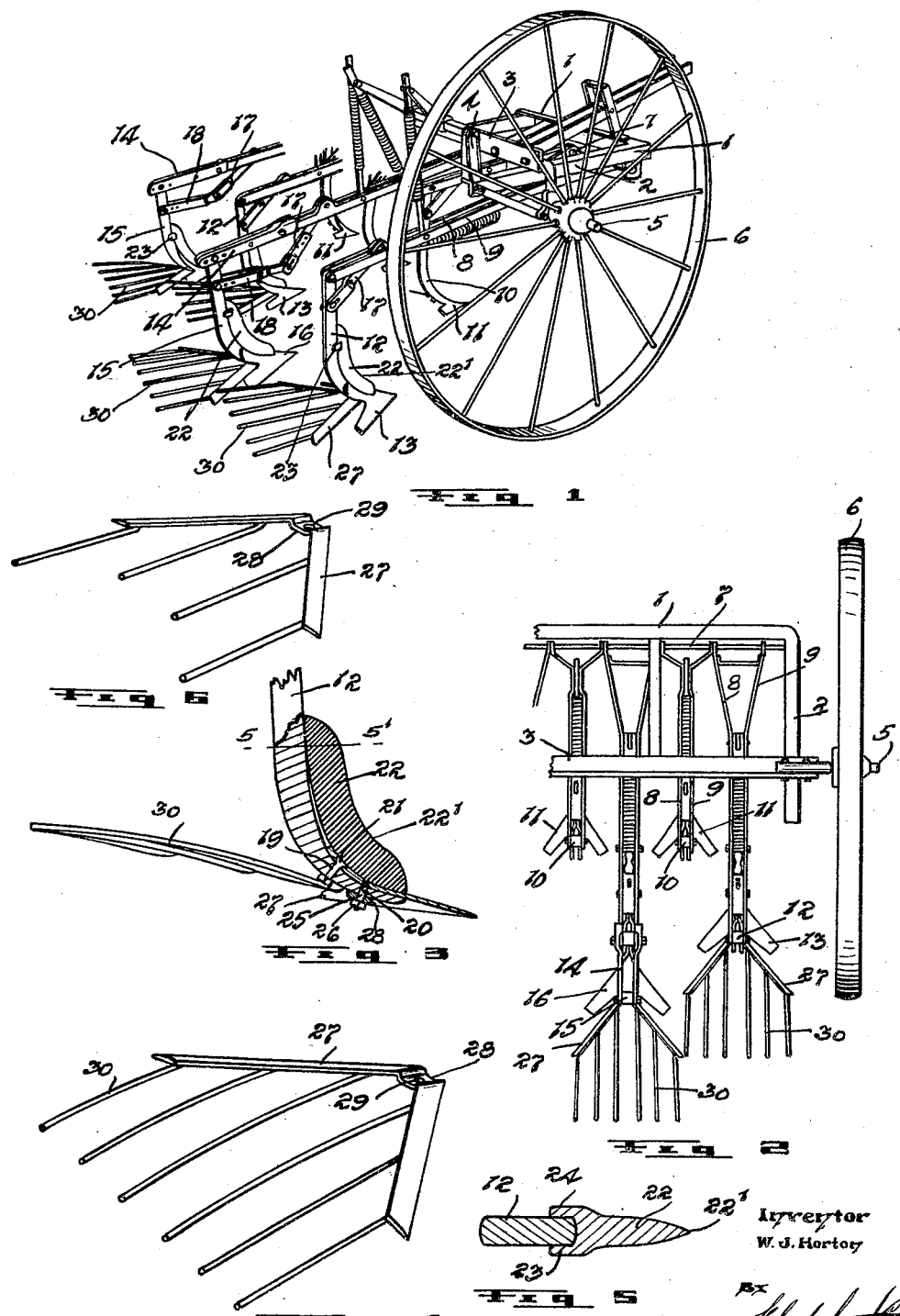

Patented Aug. 9, 1932

1,870,850

UNITED STATES PATENT OFFICE

WILLIAM J. HORTON OF WINNIPEG, MANITOBA, CANADA

ATTACHMENT TO CULTIVATING MACHINES

Application filed October 12, 1928. Serial No. 312,120.

The invention relates to improvements in attachments to cultivating machines and an object of the invention is to provide an attachment to a cultivating machine which will permit of the landing being effectively cultivated and will also serve at the same time to clear the soil of weeds, roots and such like, these being brought to the surface of the cultivated land where they will be subsequently killed by exposure to the sun and winds.

A further object is to provide means whereby a cultivating machine of well known type can be readily provided with my invention and without altering its value as a cultivator and whilst adding the valuable feature of weeding coincident with cultivating.

A further object is to provide a combination cultivating and weeding machine designed so that the same cannot be clogged by either the soil or weeds and wherein the cultivators and weeding attachment can be simultaneously adjusted as desired.

A further object is to provide a weed separating attachment which can be easily and quickly attached to the existing cultivator shank and also to provide a coulter readily attachable to the shank and operating to cut the soil and prevent the weeds from accumulating on the shank.

A further object is to construct both the weed separating attachment and the coulter so that both can be effectively fastened to the shank by a single bolt and whilst disturbing in no way the fastening of the customary V-shaped crow foot, shovel or point.

With the above more important objects in view, the invention consists essentially in the arrangement and construction of parts hereinafter more particularly described, reference being had to the accompanying drawing, in which:—

Fig. 1 is a perspective view of a portion of the cultivating machine as it appears equipped with my attachment.

Fig. 2 is a diagrammatic plan view of one end of the machine.

Fig. 3 is a vertical sectional view through the lower end of the shank and parts carried thereby.

Fig. 4 is a perspective view of the weed separating attachment.

Fig. 5 is a horizontal sectional view at 5—5' Figure 3.

Fig. 6 is a perspective view of a modified form of the weeding attachment.

In the drawing like characters of reference indicate corresponding parts in the several figures.

The cultivating machine presents a forward beam 1 having the ends thereof back turned as indicated at 2 and such forms an open sided substantially rectangular frame above the rear end of which a cross beam 3 is located, such latter beam being carried by similar uprights 4. The ends of the frame are supported by similar drop axles 5 secured each to the ends of the beam 3 and on each axle a ground wheel 6 is rotatably mounted.

Forwardly the frame is provided with a lengthwise extending rod 7 and this rod carries pivotally the forward ends of pairs of drag bars 8 and 9. The drag bars are arranged in two sets, there being a short set of drag bars and a long set of drag bars which are alternated one in respect to the other. The rear ends of the forward set of drag bars all carry downwardly extending similar shanks 10 which are provided at their lower ends with the customary V-shaped crow foot, shovel or point 11 for ground cultivating purposes. The rear ends of the longer drag bars are customarily provided in this type of machine with downwardly extending shanks corresponding to those 10 and such shanks are provided also with V-shaped shovels corresponding to those 11 so that there is a forward transversely extending row of shovels and a rearward transversely extending row of shovels, the rear shovels being alternated with the front ones.

I have found, however, that in equipping a cultivating machine of this kind with my weeding device, it is desirable to maintain the front row of shovels without alteration and behind these I require to re-arrange the position of the other shovels and to this end I proceed as follows.

I do not alter in any way say the first, third, fifth and so on pairs of long drag bars of the machine and as before stated these carry a shank 12 corresponding to that 10 and the lower end of the shank carries the customary V-shaped crow foot, shovel or point 13. The second, fourth, sixth and so on pairs of drag bars are lengthened by extensions indicated generally by the reference numeral 14 and the rear ends of these extensions carry downwardly extending shanks 15 which are provided at their lower ends with the customary V-shaped crow foot, shovel or point 16.

The shanks in all cases are pivotally swung at their upper ends and the machine is equipped with release lever arms 17 which are provided to free the shanks to swing rearwardly should a damaging obstruction be encountered. I do not alter the arrangement of these lever arms in any way but it will be observed that the shanks 12 are directly connected to the lower ends of the lever arms whereas the shanks 15 are connected by bars 18 to the lower ends of the lever arms. These bars 17 are required owing to the introduction of the extensions 14.

The lower ends of all the shanks 12 and 15 are each provided in the usual way with two bolt holes 19 and 20 and usually the V-shaped crow foot, shovel or point is attached thereto by two bolts. In my case, however, the shovel is fastened primarily by a single bolt 21 which passes through the upper hole 19 in the shank.

In front of each of the shanks 12 or 15 as the case may be, I locate a coulter 22 shaped to conform to the curvature of the front side of the shank and the shovel, the lower end of the coulter overlying the shank as best shown in Figure 3. The width of the coulter is substantially the same as the width of the shank and forwardly it is sharpened to provide a cutting edge 22. The upper and lower ends of the coulter are curved in a more or less semicircular manner as best shown in Figure 3 and the cutting edge is curved in a manner also shown in such figure. The coulter is provided adjoining the upper end with a pair of rearwardly extending lugs 23 and 24 which are adapted to engage the sides of the shank and prevent lateral displacement of the upper end of the coulter in regard to the shank. The lower end of the coulter carries a screw threaded stud 25 which is positioned to pass through the hole 20 in the shank in the manner shown in Figure 3. The stud is provided with a nut 26.

I also provide, for each shank which carries a coulter, a V-shaped or winged plate 27, the plate conforming more or less to the general shape of the shovel. The wings are somewhat longer than the wings of the shovel and they are inclined at approximately the same angle as the wings of the shovel. At its foremost point, that is, at the point where the wings are joined, the plate is down pressed to provide a socket or seat 28 which is adapted to receive the under side of the lower end of the shank. The socket is provided with a central hole 29 through which the stud 25 passes. Obviously after one puts the winged plate in position with the stud in the hole 29, he can readily fasten not only the winged plate but also the coulter to the shank by applying and tightening up the nut 26. The stud will also at this time serve to hold the shovel.

According to the arrangement the fastening of the coulter and the winged plate to the shank is a very simple one and after the fastening is made by the stud, the lugs prevent lateral shifting of the upper end of the coulter and the socket 28 prevents turning of the winged plate in respect to the coulter. The wings of the plate when finally in position lie directly behind the wings of the shovel so that the material passed over the shovel moves over the wings of the plate.

To the wings of each plate, I permanently secure as by spot welding the forward ends of rearwardly extending fingers 30. These fingers are slightly bowed as best shown in Figure 3. By observing Figure 2 of the drawing, it will be seen that the winged plate and the fingers carried thereby of the shank 12 are in advance of those carried by the shank 15 and that the fingers are arranged so that none of the land can pass through without being acted upon by the winged plates and the fingers.

According to the arrangement provided, it will be apparent that the machine is equipped with a forward set of transversely aligned cultivating points or shovels and with an intermediate set and a rear set of transversely aligned cultivating points or shovels, the intermediate and rear sets of shovels being alternated one in respect to the other and also alternated in respect to the front shovels. Further it will be observed that the intermediate and rear sets of shovels are provided with coulters and double winged finger carrying plates, the coulters serving to cut the soil and prevent accumulation of trash on the shanks and the winged finger carrying plates serving to separate the soil from the weeds and such material and to pass the weeds to the surface of the cultivated soil where they will be subsequently killed by sun and wind.

By arranging the finger carrying winged plates as hereinbefore described, it is impossible for the soil being acted upon to bank up or accumulate as ample space is provided between the shovels for the earth and weeds to pass back and subsequently be acted upon by the fingers.

Whilst I have provided the extension 14 to increase the length of the drag bars to which they are attached, it will be readily apparent that the same purpose could be accomplished by doing away with such extensions and making such selected drag bars longer. As the machine, however, having drag bars as herein shown, is now manufactured, it is a very easy matter to equip it with my attachment by supplying the extensions.

Where comparatively light soil is being worked with this machine, a winged plate such as shown in Figure 4 will be used whereas if the machine is operating in heavy or clay soil a plate such as shown in Figure 6 will be provided. The latter plate has less fingers than that shown in Figure 4 so that there is more opportunity for the heavier soil to pass through and the weeds separated therefrom.

What I claim as my invention:—

1. In a cultivating attachment, the combination with a curved shank and a doubly winged cultivating point fastened by a single bolt to the lower end thereof, of a vertically disposed curved coulter having the upper end thereof engaging the shank and provided with a pair of rearwardly extending lugs preventing lateral displacement of the coulter in respect to the shank, the lower end thereof being provided with a downwardly extending fastening bolt passing through the cultivating point and the shank, and a weed and soil separating attachment fastened to the under side of the shank by the latter bolt and provided with a central socket receiving the under side of the shank.

2. In a cultivating attachment, the combination with a curved shank and a doubly winged cultivating point fastened by a single bolt to the lower end thereof, of a vertically disposed curved coulter having the upper end thereof engaging the shank and provided with a pair of rearwardly extending lugs preventing lateral displacement of the coulter in respect to the shank, the lower end thereof being provided with a downwardly extending fastening bolt passing through the cultivating point and the shank, and a weed and soil separating attachment fastened to the under side of the shank by the latter bolt embodying a doubly winged plate having spaced fingers extending rearwardly from the wings thereof, said plate being provided centrally with a socket receiving the under side of the shank.

Signed at Winnipeg this 2nd day of August, 1928.

WILLIAM J. HORTON.